No. 610,035. Patented Aug. 30, 1898.
G. W. EDGINGTON.
AUTOMATIC STOP VALVE FOR HOSE COUPLINGS.
(Application filed Feb. 3, 1898.)
(No Model.)
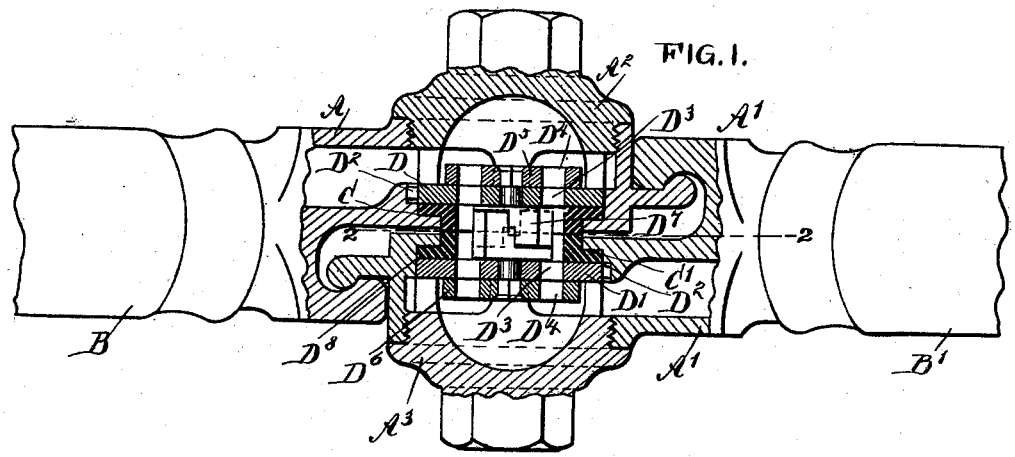
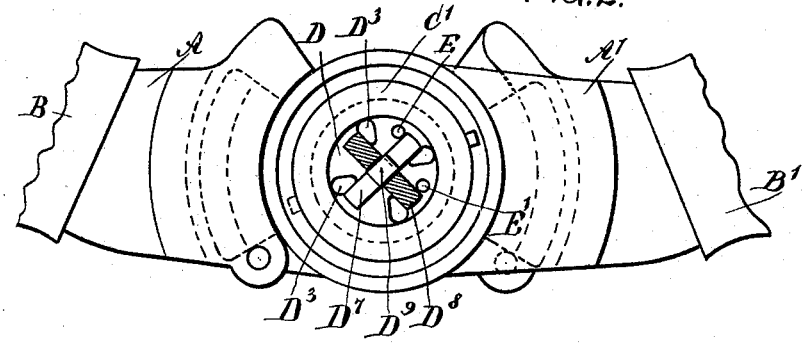
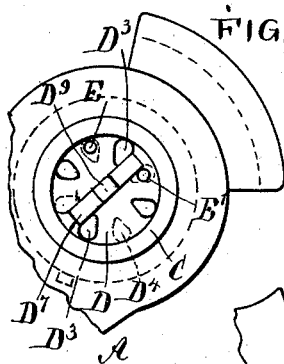
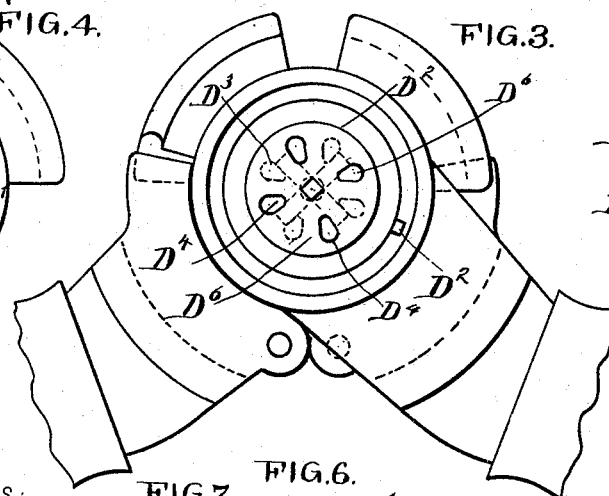
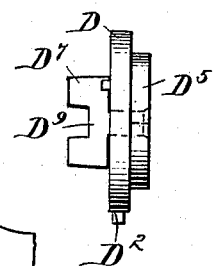
WITNESSES:
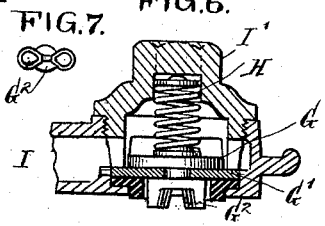
INVENTOR
G. W. Edgington.
BY
ATTORNEYS.

UNITED STATES PATENT OFFICE.

GEORGE W. EDGINGTON, OF COALVILLE, UTAH, ASSIGNOR OF ONE-FIFTH TO ALMA ELDREDGE, OF SAME PLACE.

AUTOMATIC STOP-VALVE FOR HOSE-COUPLINGS.

SPECIFICATION forming part of Letters Patent No. 610,035, dated August 30, 1898.

Application filed February 3, 1898. Serial No. 669,005. (No model.)

*To all whom it may concern:*

Be it known that I, GEORGE W. EDGINGTON, of Coalville, in the county of Summit and State of Utah, have invented a new and Improved Automatic Stop-Valve for Hose-Couplings, of which the following is a full, clear, and exact description.

The invention relates to fluid-pressure brakes; and its object is to provide a new and improved automatic stop-valve for hose-couplings arranged to positively close each of the coupling members upon uncoupling the same to prevent dust and other impurities from passing into the train-pipe and to the triple valve or other parts of the brake mechanism.

The invention consists of novel features and parts and combinations of the same, as will be fully described hereinafter and pointed out in the claims.

Reference is to be had to the accompanying drawings, forming a part of this specification, in which similar characters of reference indicate corresponding parts in all the figures.

Figure 1 is a sectional side elevation of the improvement. Fig. 2 is an inverted plan view of the improvement, with part in section, on the line 2 2 of Fig. 1. Fig. 3 is a similar view of the same with the coupling members in a different position and the closing-plug removed. Fig. 4 is a plan view of one of the coupling members. Fig. 5 is a side elevation of one of the valves. Fig. 6 is a sectional side elevation of a modified form of the improvement, and Fig. 7 is an inverted plan view of the valve-stem.

The hose-coupling is provided with the usual coupling members A A', attached to the ends B B' of a hose, as plainly indicated in the drawings, and the said coupling members are provided at their coupling-faces with the usual gaskets C C', respectively, adapted to fit one upon the other to establish the usual tight joint between the members. On the inner faces of the gaskets C C' are arranged valves provided with valve-seats D D', respectively, each provided on its edge with a pin $D^2$, engaging a corresponding recess in the coupling member A or A', so as to prevent the seat from turning on the corresponding gasket. The seats D D' are held in place on the gasket against vertical movement by the inner projecting ends or lugs on the closing-plugs $A^2 A^3$, screwed in the coupling members A A' to give access to the valves whenever desired.

The valve-seats D D' are provided with apertures $D^3$, preferably arranged in a circle, as indicated in Figs. 2, 3, and 4, and are adapted to register with corresponding apertures $D^4$ formed in valve-disks $D^5 D^6$, mounted to turn on the valve-seats D D', respectively, as will be readily understood by reference to Fig. 1. The valve-disks $D^5 D^6$ are provided with valve-stems $D^7 D^8$, respectively, extending into the openings of the gaskets C C', and each stem is provided or formed with a notch $D^9$ to permit of interlocking the two valve-stems at a right angle to each other, so that when the coupling members A A' are closed the valve-disks $D^5 D^6$ are turned so as to bring their openings $D^4$ in register with the openings $D^3$ in the seats D D'. Thus when the coupling members A A' are finally coupled communication is established with the said registering apertures and the openings in the gaskets to provide communication between the hose ends B B'. When the coupling members A A' are uncoupled, then the interlocked valve-stems $D^7 D^8$ again turn the valve-disks $D^5 D^6$ so as to bring their apertures $D^4$ out of register with the apertures $D^3$ to close the valves. Thus when the two coupling members are separated their ends are completely closed and dust and other impurities are not liable to pass into the train-pipe, the triple valve, or other parts of the brake mechanism.

It will be seen that when the valves are in a closed position the air is not liable to leak past the valves, as the pressure of the air is directly upon the valve-disks and presses the same in firm contact with their valve-seats, and consequently leakage is not liable to take place.

The movement of the valve-stems $D^7 D^8$ is limited by stop-pins E E', attached to the corresponding seats D D' to prevent the valve-disks from being turned too far when coupling and uncoupling the members.

As illustrated in Figs. 6 and 7, the valve-disk G is held to the seat G' by a spring H, held in the plug I' of the coupling member I, and the valve-stem $G^3$ has the ends of its depending portion rounded to insure a proper interlocking of the stems and turning of the valves, so that the friction is reduced to a minimum.

Having thus fully described my invention, I claim as new and desire to secure by Letters Patent—

1. In a hose-coupling the combination of a body portion or member, provided with a cavity opening at each face thereof, a plug screwed into the outer end of the cavity to close the same, a valve-seat held in the cavity by engagement with the plug, the valve-seat being provided with orifices, a valve-disk having its face bearing against the inner face of the valve-seat and having orifices coacting with the orifices in the valve-seat, a valve-stem attached to the valve-disk and extending through the valve-seat to the inner face of the body portion or member, and a gasket held at the inner end of the cavity and engaged by the valve-seat.

2. In a hose-coupling, the combination of a body portion or member having a cavity therein and extending through each face thereof, a plug screwed in the outer end of the cavity, a valve-seat mounted in the cavity and engaged by the plug whereby to hold the valve-seat, a valve-disk engaging the inner face of the valve-seat, and a valve-stem attached to the valve-disk and extending through the valve-seat and projecting out from the inner end of the cavity.

3. In a hose-coupling the combination of a coupling member or body portion having a cavity therein, the cavity opening at the inner face of the coupling member or body portion, a valve-seat held rigidly in the cavity, a valve-disk mounted on the inner face of the valve-seat and coacting therewith, and a valve-stem attached to the valve-disk and passing revolubly through the valve-seat, the valve-stem projecting inward beyond the inner end of the cavity.

GEORGE W. EDGINGTON.

Witnesses:
JOHN T. HODSON,
L. E. ELDREDGE.